(12) United States Patent
Kojima et al.

(10) Patent No.: US 11,892,146 B2
(45) Date of Patent: Feb. 6, 2024

(54) ELECTRONIC DEVICE

(71) Applicant: ZEON CORPORATION, Tokyo (JP)

(72) Inventors: Kiyoshige Kojima, Tokyo (JP); Masayoshi Yoshida, Tokyo (JP); Takatoshi Matsuo, Tokyo (JP); Midori Yamaai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 583 days.

(21) Appl. No.: 17/256,003

(22) PCT Filed: Jun. 12, 2019

(86) PCT No.: PCT/JP2019/023343
§ 371 (c)(1),
(2) Date: Dec. 24, 2020

(87) PCT Pub. No.: WO2020/021895
PCT Pub. Date: Jan. 30, 2020

(65) Prior Publication Data
US 2021/0270495 A1 Sep. 2, 2021

(30) Foreign Application Priority Data
Jul. 26, 2018 (JP) ................. 2018-140524

(51) Int. Cl.
*F21V 21/088* (2006.01)
*H02J 3/38* (2006.01)
*H01M 10/46* (2006.01)
*F21L 4/08* (2006.01)
*F24S 25/60* (2018.01)

(52) U.S. Cl.
CPC ............ *F21V 21/0885* (2013.01); *F21L 4/08* (2013.01); *H01M 10/465* (2013.01); *H02J 3/381* (2013.01);
(Continued)

(58) Field of Classification Search
CPC .... F21S 2025/60; H02J 3/381; H01M 10/465; F21L 4/08; F21V 21/0885
See application file for complete search history.

(56) References Cited

U.S. PATENT DOCUMENTS 7,549,245 B2 *  6/2009  Ter-Hovhannissian ..................... G09F 13/04
                                                        40/607.09
7,674,002 B1    3/2010  Wang

FOREIGN PATENT DOCUMENTS

CN   101900249 A    12/2010
CN   103380326 A  * 10/2013 ................ F21L 4/08
(Continued)

OTHER PUBLICATIONS

Npl search innovation q+ Aug. 12, 2023.*
(Continued)

*Primary Examiner* — Anabel Ton
(74) *Attorney, Agent, or Firm* — KENJA IP LAW PC

(57) ABSTRACT

Disclosed is an electronic device which comprises: a first housing; a second housing; a support configured to couple the first housing and the second housing such that the first housing is rotatable with respect to the second housing; a spring configured to apply an elastic force to the first housing and the second housing such that one end of the first housing abuts against one end of the second housing; and a connector disposed within the first housing, wherein the first housing, the second housing, the support and the spring function as a clip capable of clamping an object between the one end of the first housing and the one end of the second housing, and wherein the connector is mechanically and electrically attachable to or detachable from a connector of an external energy harvesting module through an opening provided in a side surface of the first housing.

8 Claims, 14 Drawing Sheets

(52) U.S. Cl.
　　　CPC ... *F24S 2025/6003* (2018.05); *H02J 2300/24* (2020.01)

(56) References Cited

FOREIGN PATENT DOCUMENTS

| | | |
|---|---|---|
| CN | 207340027 U | 5/2018 |
| JP | S53122105 U | 9/1978 |
| JP | S60189101 A | 9/1985 |
| JP | H018756 U | 1/1989 |
| JP | H054527 U | 1/1993 |
| JP | 3095756 U | 8/2003 |
| JP | 3125525 U | 9/2006 |
| WO | 2007073047 A1 | 6/2007 |

OTHER PUBLICATIONS

Apr. 11, 2022, the Extended European Search Report issued by the European Patent Office in the corresponding European Patent Application No. 19840876.7.

Aug. 27, 2019, International Search Report issued in the International Patent Application No. PCT/JP2019/023343.

Jan. 26, 2021, International Preliminary Report on Patentability issued in the International Patent Application No. PCT/JP2019/023343.

Jun. 14, 2023, Communication pursuant to Article 94(3) EPC issued by the European Patent Office in the corresponding European Patent Application No. 19840876.7.

* cited by examiner

ELECTRONIC DEVICE

TECHNICAL FIELD

The present disclosure relates to an electronic device.

BACKGROUND

In recent years, there has been a growing demand for portable energy harvesting modules configured to generate power according to the external environment so that they can provide power even when users are out of their house and cannot have access to commercial power supplies. Such energy harvesting modules include solar cell modules which comprise solar cells configured to generate power using light energy such as that from sunlight.

If it is possible for a portable energy harvesting module to be mounted to a certain object, the freedom of placement is conveniently increased. For example, PTL 1 discloses an electronic device in which a solar cell is provided on the surface of a mounting clip.

CITATION LIST

Patent Literature

PTL 1: JPH01008756U

SUMMARY

Technical Problem

When a solar cell is provided on the surface of a mounting clip, however, the solar cell receives direct stress and may be easily damaged because the clip needs to be opened by directly holding the solar cell when mounting the clip to an object.

It is therefore an object of present disclosure to solve the problem described above by providing an electronic device which can be mounted to an object without applying direct stress to an energy harvesting module and which can receive power from the energy harvesting module.

Solution to Problem

The present disclosure aims to advantageously solve the above problem, and the disclosed electronic device comprises: a first housing; a second housing; a support configured to couple the first housing and the second housing such that the first housing is rotatable with respect to the second housing; a spring configured to apply an elastic force to the first housing and the second housing such that one end of the first housing abuts against one end of the second housing; and a connector disposed within the first housing, wherein the first housing, the second housing, the support and the spring function as a clip capable of clamping an object between the one end of the first housing and the one end of the second housing, and wherein the connector is mechanically and electrically attachable to or detachable from a connector of an external energy harvesting module through an opening provided in a side surface of the first housing. With such a configuration, a force is applied to the other end of the first housing and to the other end of the second housing when the electronic device functions as a clip to clamp an object. Thus, even when an external energy harvesting module has been mounted to the connector, the energy harvesting module does not receive direct stress. In addition, the disclosed electronic device can receive power from the energy harvesting module mounted to the connector. Therefore, the disclosed electronic device can be mounted to an object without applying direct stress to the energy harvesting module and can receive power from the energy harvesting module.

Preferably, the disclosed electronic device further comprises: a secondary battery for storing power supplied from the energy harvesting module through the connector; and a load circuit element capable of consuming power supplied from the energy harvesting module or power supplied from the secondary battery, wherein the secondary battery and the load circuit element are disposed within either of the first housing and the second housing. With this configuration, the power supplied from the energy harvesting module mounted to the electronic device can be stored in the secondary battery, so that the power can be supplied from the secondary battery to the load circuit element even in a state where the energy harvesting module is detached.

Preferably, in the disclosed electronic device, the secondary battery and the load circuit element are disposed within the first housing. With such a configuration, the connector, the secondary battery, and the load circuit element are located within one housing, thus facilitating wiring among the connector, the secondary battery, and the load circuit element.

Preferably, in the disclosed electronic device, the load circuit element is a light-emitting element. With such a configuration, the user can enjoy the light emitted from the light-emitting element by the power supplied from the energy harvesting module.

Preferably, in the disclosed electronic device, the load circuit element comprises: a light-emitting element; a timer configured to alternately generate a first period and a second period; and a waveform shaping circuit configured to control a current supplied to the light-emitting element, wherein the waveform shaping circuit increases a current supplied to the light-emitting element with time during the first period and decreases a current supplied to the light-emitting element over time during the second period. With such a configuration, the light-emitting element can emit light similar to that of fireflies by allowing the light to pass through a cover or other member having a light diffusing function (later described), so that the user can feel a sense of life.

Preferably, the disclosed electronic device further comprises a wiring board, wherein the load circuit element is disposed on the wiring board. With such a configuration, it is possible to simplify the wiring of the load circuit element.

Preferably, in the disclosed electronic device, the secondary battery and the wiring board are disposed within the first housing, and the secondary battery is disposed between a surface of the first housing on the second housing side and the wiring board. With such a configuration, it is possible to reduce the size of the first housing.

Preferably, in the disclosed electronic device, the second housing has a flat bottom surface or a leg. With such a configuration, the electronic device can be stably placed on a flat surface, such as on a table or a floor.

Preferably, in the disclosed electronic device, the first housing comprises: a first clip part coupled to the support and the spring; and a cover attachable to and detachable from the first clip part.

Preferably, in the disclosed electronic device, the first housing comprises: a first clip part coupled to the support and the spring; a cover; and a coupling part coupling one end of the first clip part and one end of the cover, wherein the cover is rotatable about the coupling part as a support with respect to the first clip part. With such a configuration, the electronic device can increase the freedom in the direction in which the light-receiving surface of the mounted energy harvesting module can be directed.

Preferably, in the disclosed electronic device, the cover comprises a plurality of cover units having light transparency. With such a configuration, each cover unit can have a different function.

Preferably, in the disclosed electronic device, the second housing comprises an adhesive portion which is adherable to an external support. With such a configuration, it is possible to increase the freedom of installation location of the electronic device.

Advantageous Effect

According to the present disclosure, it is possible to provide an electronic device which can be mounted to an object without applying direct stress to an energy harvesting module and which can receive power from the energy harvesting module.

DETAILED DESCRIPTION

Figure 1:
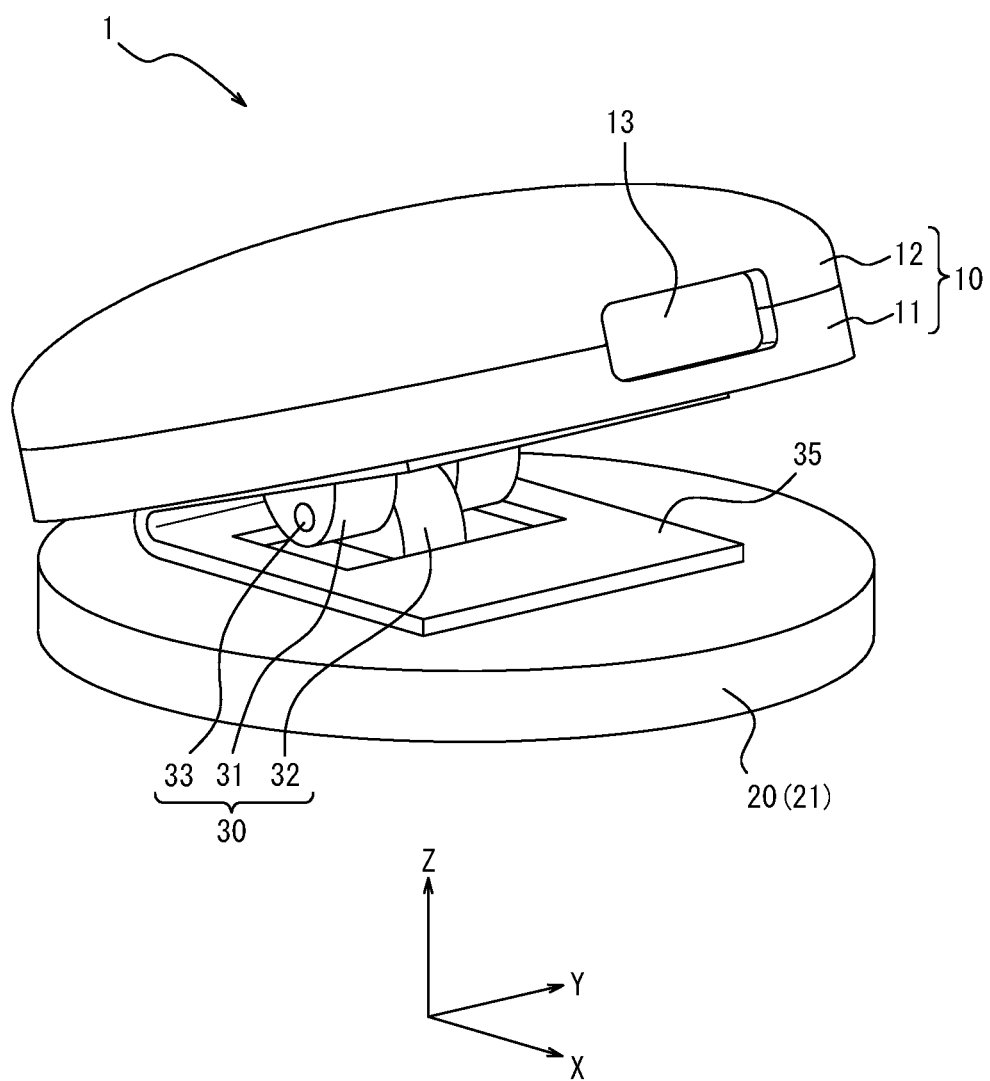
FIG. 1 is a perspective view illustrating a schematic configuration of an electronic device according to an embodiment of present disclosure.

Hereinafter, embodiments of the present disclosure will be described with reference to the accompanying drawings. Common components in the drawings are given the same reference signs.

Figure 2:
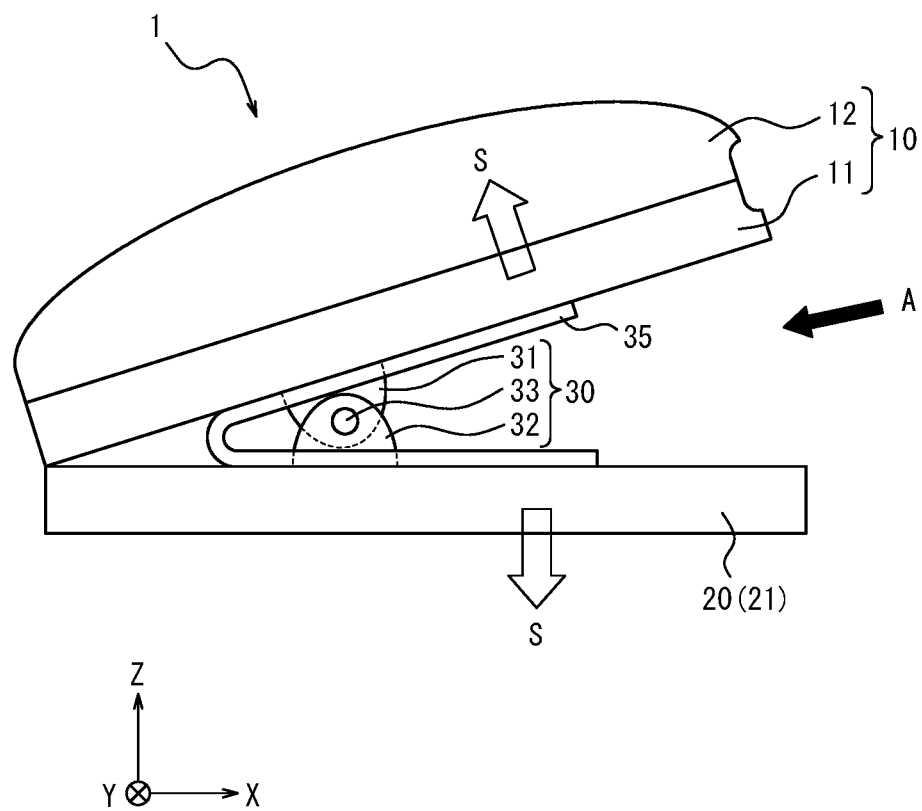
FIG. 2 is a side view illustrating a schematic configuration of the electronic device of FIG. 1.
Figure 3:
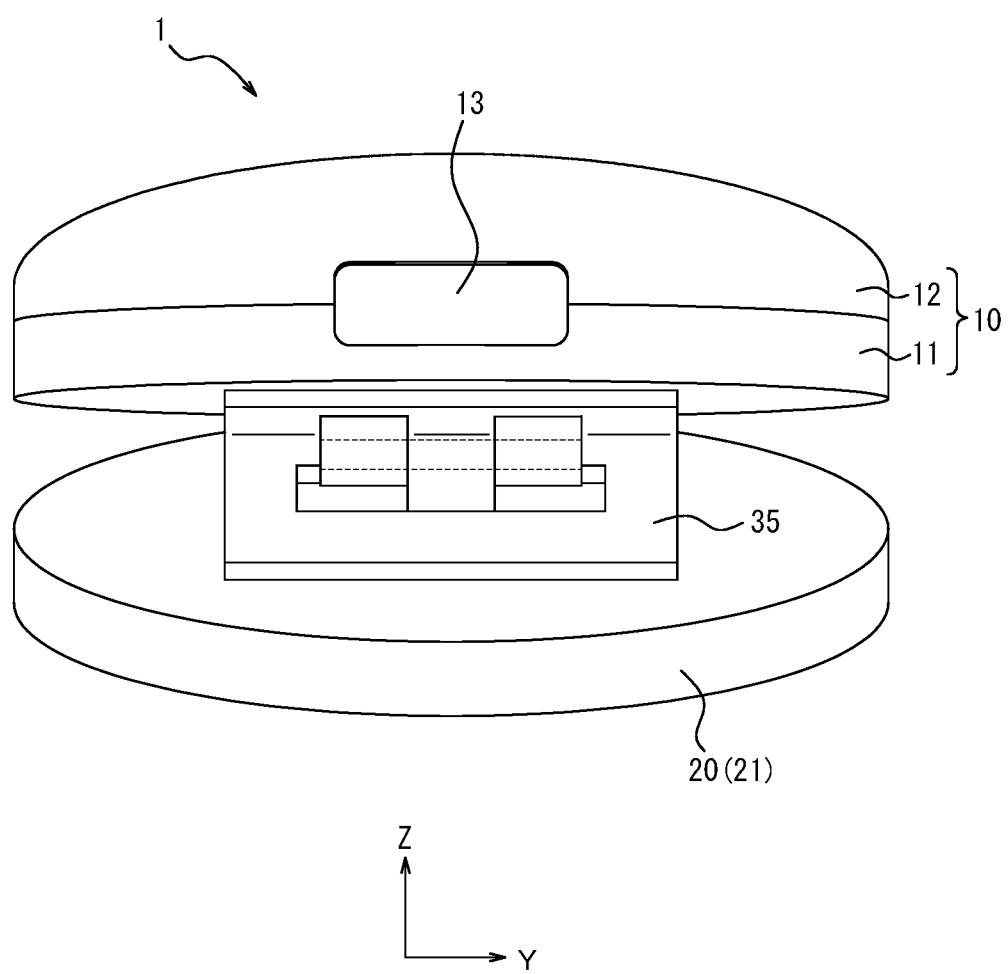
FIG. 3 is a front view illustrating a schematic configuration of the electronic device of FIG. 1.

First, referring to FIGS. 1 to 3, a configuration of an electronic device 1 according to an embodiment of the present disclosure will be described. FIG. 1 is a perspective view illustrating a schematic configuration of the electronic device 1 according to an embodiment of the present disclosure. FIG. 2 is a side view of the electronic device 1. FIG. 3 is a front view of the electronic device 1 as viewed from the direction A illustrated in FIG. 2.

Figure 4A:
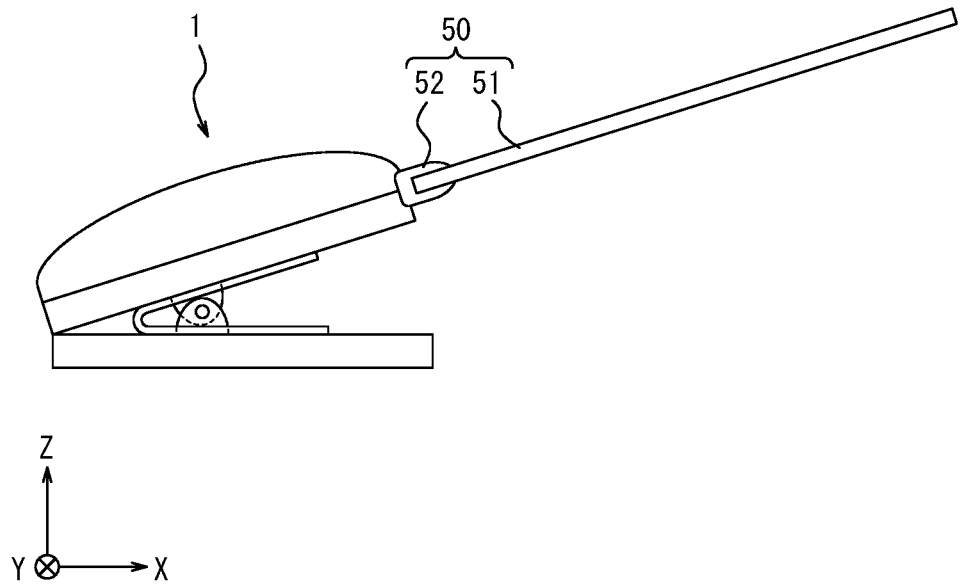
FIG. 4A is a side view illustrating how an energy harvesting module is mounted to an electronic device.
Figure 4B:
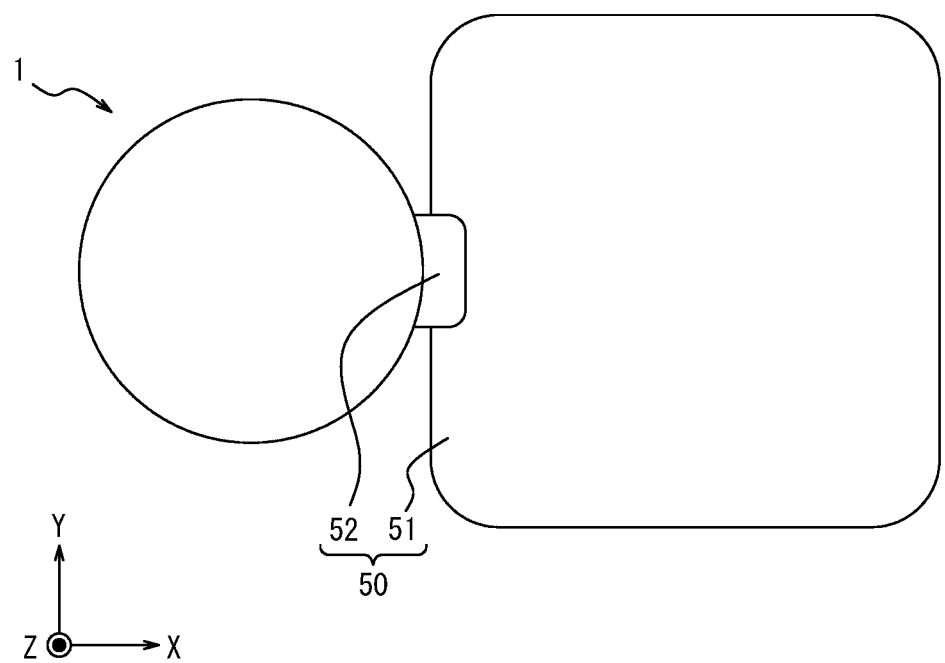
FIG. 4B is a top view illustrating how an energy harvesting module is mounted to an electronic device.

The electronic device 1 is mechanically and electrically attachable to and detachable from an external energy harvesting module. FIGS. 4A and 4B illustrate how an energy harvesting module 50 is mounted to the electronic device 1. FIG. 4A is a side view illustrating how the energy harvesting module 50 is mounted to the electronic device 1. FIG. 4B is a top view illustrating how the energy harvesting module 50 is mounted to the electronic device 1.

The electronic device 1 can receive generated power from the energy harvesting module 50 when the energy harvesting module 50 is mounted to the electronic device 1. Upon receipt of power from the energy harvesting module 50, the electronic device 1 can provide the power to a load circuit element disposed within the electronic device 1 and operate the load circuit element. The load circuit element may be, for example, a light-emitting element. Further, the electronic device 1 may comprise a secondary battery inside. When the secondary battery has been charged by the power supplied from the energy harvesting module 50, the electronic device 1 can provide the power from the secondary battery to the load circuit element even in cases where the energy harvesting module 50 has been detached from the electronic device 1.

In the present embodiment, the energy harvesting module 50 is described as having a solar cell that generates power by utilizing light energy such as that from sunlight or indoor light. Alternatively, the energy harvesting module 50 may comprise, for example, a thermoelectric conversion element that generates power by utilizing heat energy such as geothermal heat.

The energy harvesting module 50 comprises an energy harvesting element 51 and a connector 52. The energy harvesting element 51 has a flat shape. The energy harvesting element 51 has a solar cell that generates power by utilizing light energy such as that from sunlight or indoor light. The connector 52 outputs the power generated by the energy harvesting element 51. The energy harvesting module 50 may further comprise a protective member on the outer periphery of the energy harvesting element 51. With the protective member, the energy harvesting module 50 can protect the energy harvesting element 51 in the event of a fall or a collision with a person.

The electronic device 1 comprises a first housing 10, a second housing 20, a support 30, and a spring 35, as illustrated in FIGS. 1 to 3.

The first housing 10 comprises a first clip part 11 and a cover 12.

The first clip part 11 has a flat shape on the second housing 20 side. In other words, the first clip part 11 has a flat portion on the second housing 20 side.

The cover 12 is connected to the first clip part 11. The cover 12 is located opposite the second housing 20 across the first clip part 11.

The cover 12 may be integrated with the first clip part 11 or may be attachable to and detachable from the first clip part 11. When the cover 12 and the first clip part 11 are attachable to and detachable from each other, both the cover 12 and the first clip part 11 may be provided with engagement means for engaging the cover 12 with the first clip part 11. The engagement mean may be, for example, a claw, a notch, or a groove.

When a light-emitting element is disposed within the first housing 10 as a load circuit element, for example, replacing the cover 12 with one having a different light transparency, light diffusivity, etc., provides the user with different illumination effects for the light-emitting element.

An opening 13 is provided in the side surface of the first housing 10. The opening 13 functions as a hole through which the connector 52 of the energy harvesting module 50 passes when attaching or detaching the energy harvesting module 50 to or from the electronic device 1 (see FIGS. 4A and 4B). In the examples illustrated in FIGS. 1 to 3, the opening 13 is provided to extend over the first clip part 11 and the cover 12. The configuration of the opening 13 is not limited to that illustrated in FIGS. 1 to 3; the opening 13 may be provided only in the cover 12, for example.

The second housing 20 comprises a second clip part 21. Although only the second clip part 21 is illustrated as a component of the second housing 20 in FIGS. 1 to 3, the second housing 20 may comprise component(s) other than the second clip part 21. For example, as with the first housing 10, the second housing 20 may comprise a cover coupled to the second clip part 21.

The second clip part 21 has a flat shape on the first housing 10 side. In other words, the second clip part 21 has a flat portion on the first housing 10 side.

In the examples illustrated in FIGS. 1 to 3, the second clip part 21 has a flat bottom surface on the side facing away from the first housing 10. With the second housing 20 having a flat bottom surface, the electronic device 1 can be stably placed on a flat place such as on a table or a floor.

Figure 5A:
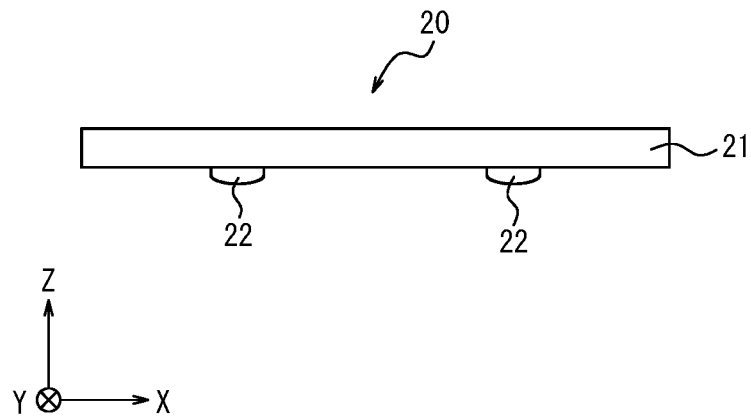
FIG. 5A is a side view of a second housing with legs.
Figure 5B:
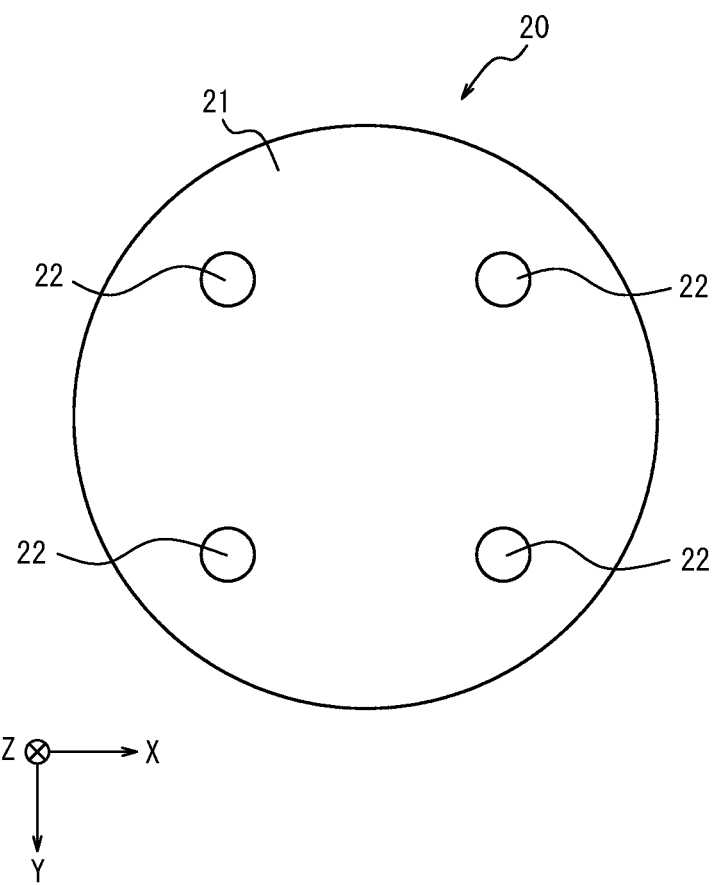
FIG. 5B is a bottom view of a second housing with legs.

As illustrated in FIGS. 5A and 5B, the second housing 20 may comprise legs 22 on the surface of the second clip part 21 facing away from the first housing 10 (i.e., on the surface on the Z-axis negative direction side). FIG. 5A is a side view of the second housing 20 with the legs 22. FIG. 5B is a bottom view of the second housing 20 with the legs 22. With the second housing 20 having the legs 22, the electronic device 1 can be stably placed on a flat place such as on a table or a floor.

As illustrated in FIGS. 1 to 3, the support 30 couples the first housing 10 and the second housing 20 such that the first housing 10 is rotatable with respect to the second housing 20. The support 30 comprises a first support 31, a second support 32, and a support shaft 33.

The first support 31 is connected to the surface of the first clip part 11 on the second housing 20 side. The second support 32 is connected to the surface of the second clip part 21 on the first housing 10 side.

The support shaft 33 passes through the through-hole of the first support 31 the through-hole of the second support 32 to function as a shaft about which the first housing 10 rotates relative to the second housing 20. The support shaft 33 may be a solid or hollow cylinder.

The spring 35 is connected to the surface of the first clip part 11 on the second housing 20 side and to the surface of the second clip part 21 on the first housing 10 side. In the examples illustrated in FIGS. 1 to 3, the spring 35 is illustrated as being a leaf spring, but is not limited thereto. The spring 35 may be a coil spring or other type of spring.

The spring 35 gives its elastic force to the first housing 10 and the second housing 20 in the directions S illustrated in FIG. 2. By the elastic force applied from the spring 35, the first housing 1 rotates about the support shaft 33 with respect to the second housing 20. As a result, in a state where no external force is applied, one end of the first housing 10 abuts against one end of the second housing 20. The one end of the first housing 10 refers to a portion near the end in the X-axis negative direction of the first housing 10. The one end of the second housing 20 refers to a portion near the end in the X-axis negative direction of the second housing 20.

With the structure as illustrated in FIGS. 1 to 3, the first housing 10, the second housing 20, the support 30 and the spring 35 function as a clip capable of clamping an object by the one end of the first housing 10 and the one end of the second housing 20. The object to be clamped by the clip can be, for example, a string, an item of clothing, a hat, a bag, or a piece of furniture.

Figure 6:
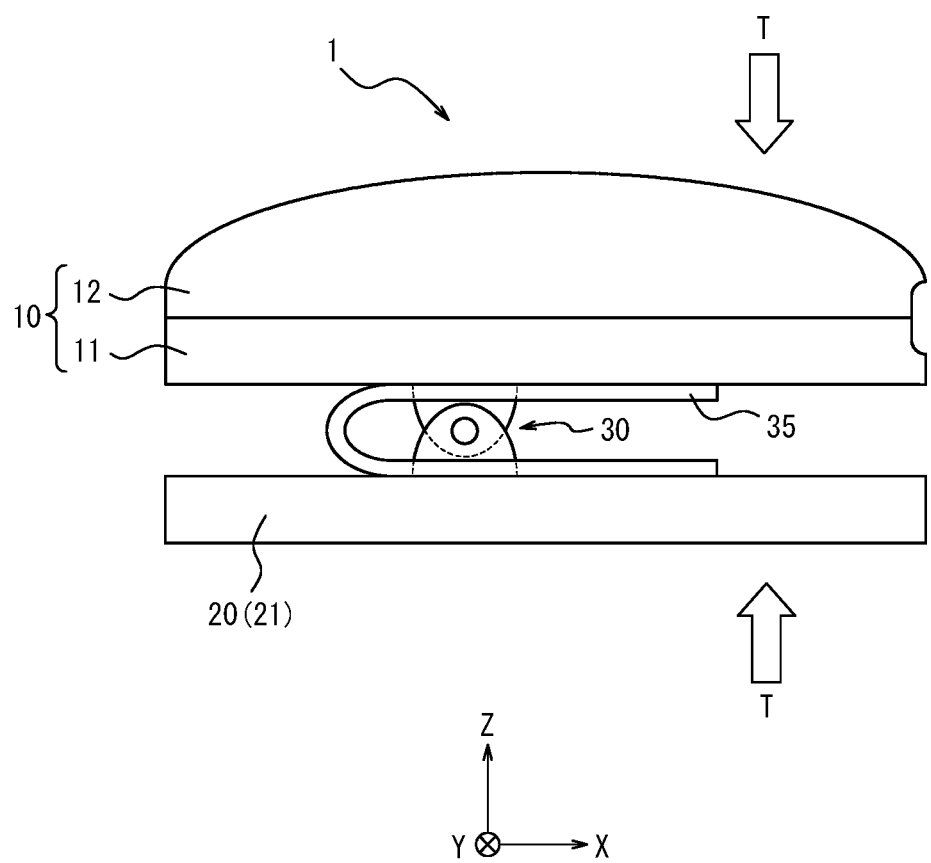
FIG. 6 is a diagram of an electronic device opened as a clip.

In order to separate the one end of the first housing 10 and the one end of the second housing 20 from each other and insert an object between the one end of the first housing 10 and the one end of the second housing 20, it is only necessary to apply forces in the directions T illustrated in FIG. 6 to the other end of the first housing 10 and the other end of the second housing 20. FIG. 6 is a diagram illustrating the clip being opened. The other end of the first housing 10 refers to a portion near the end in the X-axis positive direction of the first housing 10. The other end of the second housing 20 refers to a portion near the end in the X-axis positive direction of the second housing 20. As described above, when the electronic device 1 functions as a clip, it is configured to clamp an object with forces in the directions T being applied to the other end of the first housing 10 and the other end of the second housing 20 as illustrated in FIG. 6. With this configuration, no direct stress is applied to the energy harvesting module 50 mounted to the electronic device 1. Thus, the electronic device 1 can reduce the risk of damage to the energy harvesting module 50 mounted. Also, when the electronic device 1 functions as a clip to clamp an object, the user does not need to touch the energy harvesting module 50 thus reducing the possibility that the energy harvesting module 50 is stained with fingerprints or the like.

Figure 7A:
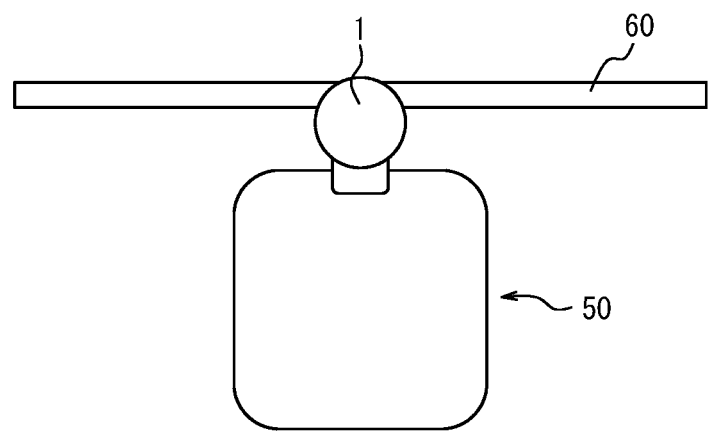
FIG. 7A is a diagram of an electronic device clamping a string, with an energy harvesting module mounted to the electronic device.
Figure 7B:
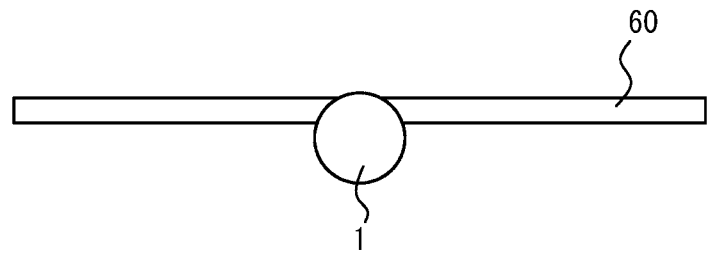
FIG. 7B is a diagram of an electronic device clamping a string, with an energy harvesting module detached from the electronic device.

FIGS. 7A and 7B illustrate how the electronic device 1 functioning as a clip clamps a string 60. FIG. 7A is a diagram of the electronic device 1 clamping the string 60 with the energy harvesting module 50 being mounted to the electronic device 1. FIG. 7B is a diagram of the electronic device 1 clamping the string 60 with the energy harvesting module 50 being detached from the electronic device 1. For example, the electronic device 1 can be used in the state illustrated in FIG. 7A when the internal secondary battery is not charged and can be used in the state illustrated in FIG. 7B when the secondary battery is charged. Thus, the use mode of the electronic device 1 can be changed depending on whether the internal secondary battery is charged or discharged, and therefore, the freedom of use mode is high.

Because the electronic device 1 functions as a clip, as illustrated in FIGS. 7A and 7B, the electronic device 1 can be placed at various locations by clamping an object such as the string 60.

Further, because the electronic device 1 has a flat bottom or legs 22 at the second housing 20, the electronic device 1 can also be placed on a flat surface instead of functioning as a clip to clamp a target object. At this time, because the first housing 10 is held obliquely with respect to the flat surface on which the electronic device 1 is placed as illustrated in FIG. 4A, it is possible for the light-receiving surface of the energy harvesting module 50 mounted to the electronic device 1 to be held obliquely upward. Thus, the electronic device 1 with the energy harvesting module 50 mounted can be placed while easily orienting it toward the sun.

Figure 8:
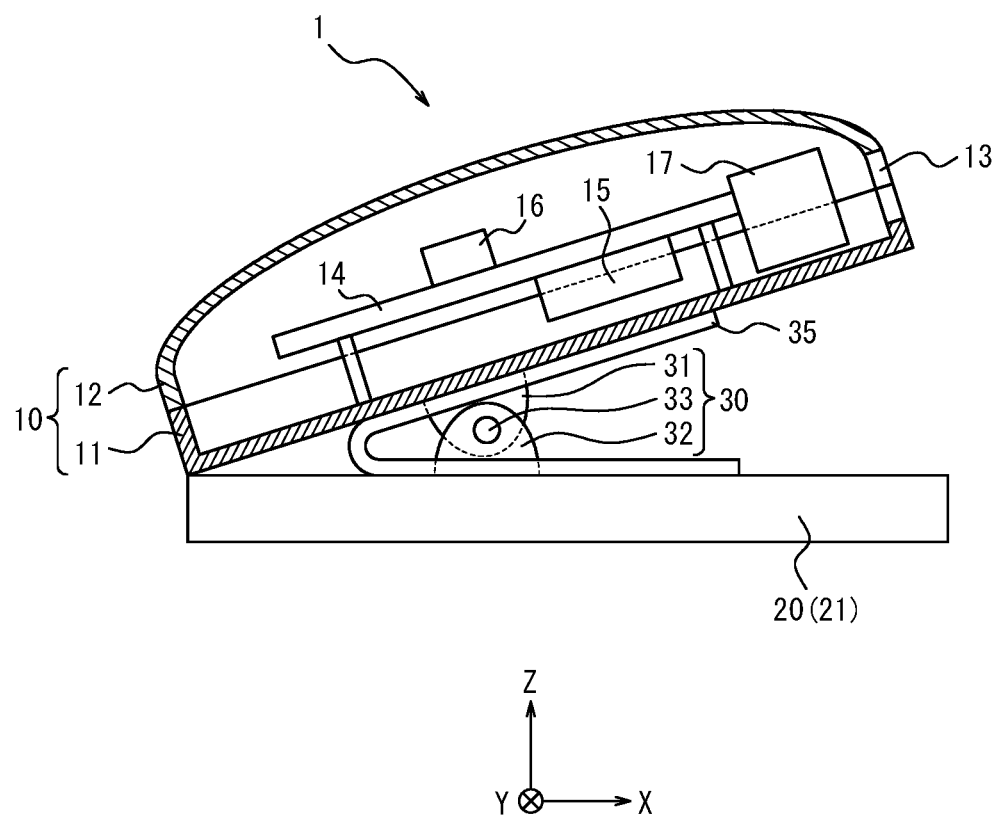
FIG. 8 is a diagram illustrating an exemplary configuration of the interior of a first housing of an electronic device.

FIG. 8 is a diagram illustrating an exemplary configuration of the interior of the first housing 10 of the electronic device 1. As illustrated in FIG. 8, the electronic device 1 comprises a wiring board 14, a secondary battery 15, a load circuit element 16, and a connector 17 within the first housing 10.

The wiring board 14 is disposed within the first housing 10 and is secured to the first housing 10. The wiring board 14 may be secured to the first clip part 11 or to the cover 12. Alternatively, the wiring board 14 may be secured to both the first clip part 11 and the cover 12.

The secondary battery 15, the load circuit element 16 and the connector 17 are disposed on the wiring board 14. The secondary battery 15, the load circuit element 16 and connector 17 are electrically connected via interconnections in the wiring board 14. By disposing the secondary battery 15, the load circuit element 16, and connector 17 on the wiring board 14 inside the first housing 10 as described above, it is possible to simplify the wiring among the secondary battery 15, the load circuit element 16, and connector 17. Further, when the wiring board 14 is disposed parallel to the flat portion of the first clip part 11, it is possible to lower the height in the perpendicular direction to the flat portion of the first clip part 11 and thus reduce the size of the first housing 10.

The secondary battery 15 is a rechargeable secondary battery. The secondary battery 15 is, for example, a lithium-ion battery or a nickel hydrogen battery. When the energy harvesting module 50 is mounted to the connector 17, the secondary battery 15 can receive power from the energy harvesting module 50 via the connector 17 and store the power therein.

When the secondary battery 15 is charged by the power supplied from the energy harvesting module 50, the secondary battery 15 can supply the stored power to the load circuit element 16.

When the secondary battery 15 is disposed on the first clip part 11 side of the wiring board 14, it is possible to reduce the size of the first housing 10.

The load circuit element 16 may be, for example, a light-emitting device such as a light-emitting diode (LED) or a speaker. The load circuit element 16 can receive power from the energy harvesting module 50 via the connector 17 when the energy harvesting module 50 is mounted to the connector 17. The load circuit element 16 can also receive power from the secondary battery 15. The load circuit element 16 can consume the power supplied from the energy harvesting module 50 or the secondary battery 15. When the load circuit element 16 is a light-emitting element, the cover 12 preferably has light transparency. With the cover 12 having light transparency, the user can see the light emitted from the light-emitting element.

The connector 17 can be mechanically and electrically attachable to and detachable from the connector 52 of the energy harvesting module 50 (see FIGS. 4A and 4B). The connector 52 of energy harvesting module 50 is inserted through the opening 13 into the interior of the first housing 10.

When the energy harvesting module 50 is mounted, the connector 17 can supply the power supplied from the energy harvesting module 50 to the secondary battery 15 or the load circuit element 16.

Although not illustrated in FIG. 8, a switch for activating the load circuit element 16 may be disposed on the first housing 10. The switch may be, for example, disposed on the outer side surface of the first housing 10. When the switch is disposed on the side surface of the first housing 10, it is possible to reduce the possibility that the user accidentally operate the switch even when the user presses the other end of the first housing 10 to open the clip. The switch can be, for example, a button switch or a slide switch. When the switch is configured to be displaced in a direction perpendicular to the direction in which the user presses the first housing 10, it is possible to further reduce the possibility that the user accidentally operates the switch when the user presses the other end of the first housing 10. The switch may alternatively be disposed on the second housing 20.

(Example of Load Circuit Element)

Figure 9:
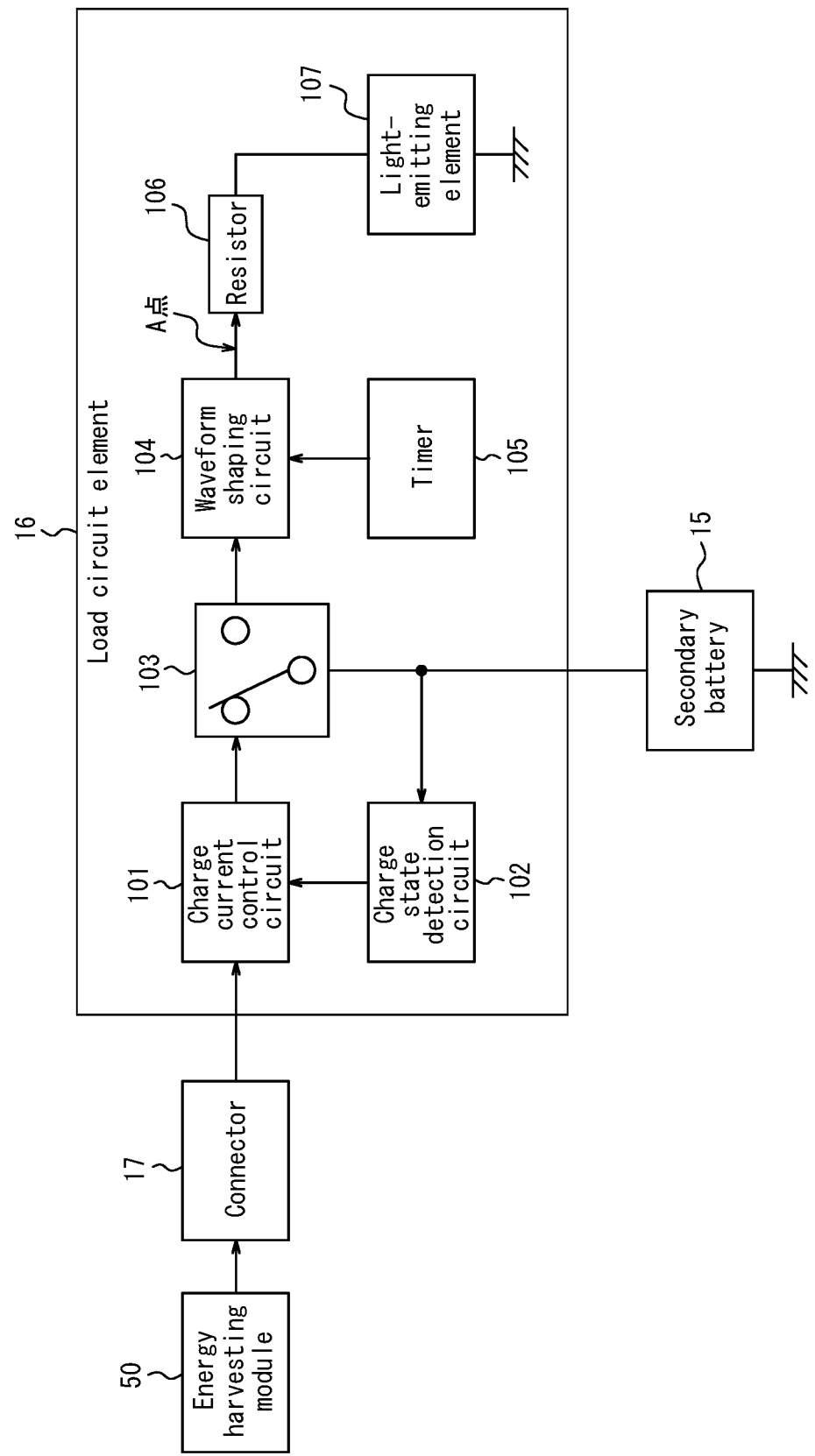
FIG. 9 is a diagram illustrating an exemplary circuit configuration of a load circuit element.

FIG. 9 illustrates an exemplary circuit configuration of the load circuit element 16. The load circuit element 16 comprises a charge current control circuit 101, a charge state detection circuit 102, a switch 103, a wave shaping circuit 104, a timer 105, a resistor 106, and a light-emitting element 107.

The load circuit element 16 illustrated in FIG. 9 is a circuit that periodically increases or decreases the intensity of light emitted by the light-emitting element 107.

The charge current control circuit 101 switches the destination of the switch 103 according to the charge amount of the secondary battery 15.

The charge state detection circuit 102 detects the charge state of the secondary battery 15 and notifies the charge current control circuit 101 of the detected charge state.

The charge current control circuit 101 controls the switch 103 such that when the charge amount of the secondary battery 15 is less than a predetermined threshold value, the secondary battery 15 is charged by the power supplied from the energy harvesting module 50 through the connector 17.

The charging current control circuit 101 controls the switch 103 such that when the charge amount of the secondary battery 15 is equal to or greater than a predetermined threshold value, the power charged in the secondary battery 15 is supplied to the light-emitting element 107 through the waveform shaping circuit 104 and the resistor 106.

The waveform shaping circuit 104 receives the timing of the first period and the second period from the timer 105 and controls the current supplied to the light-emitting element 107.

Figure 10:
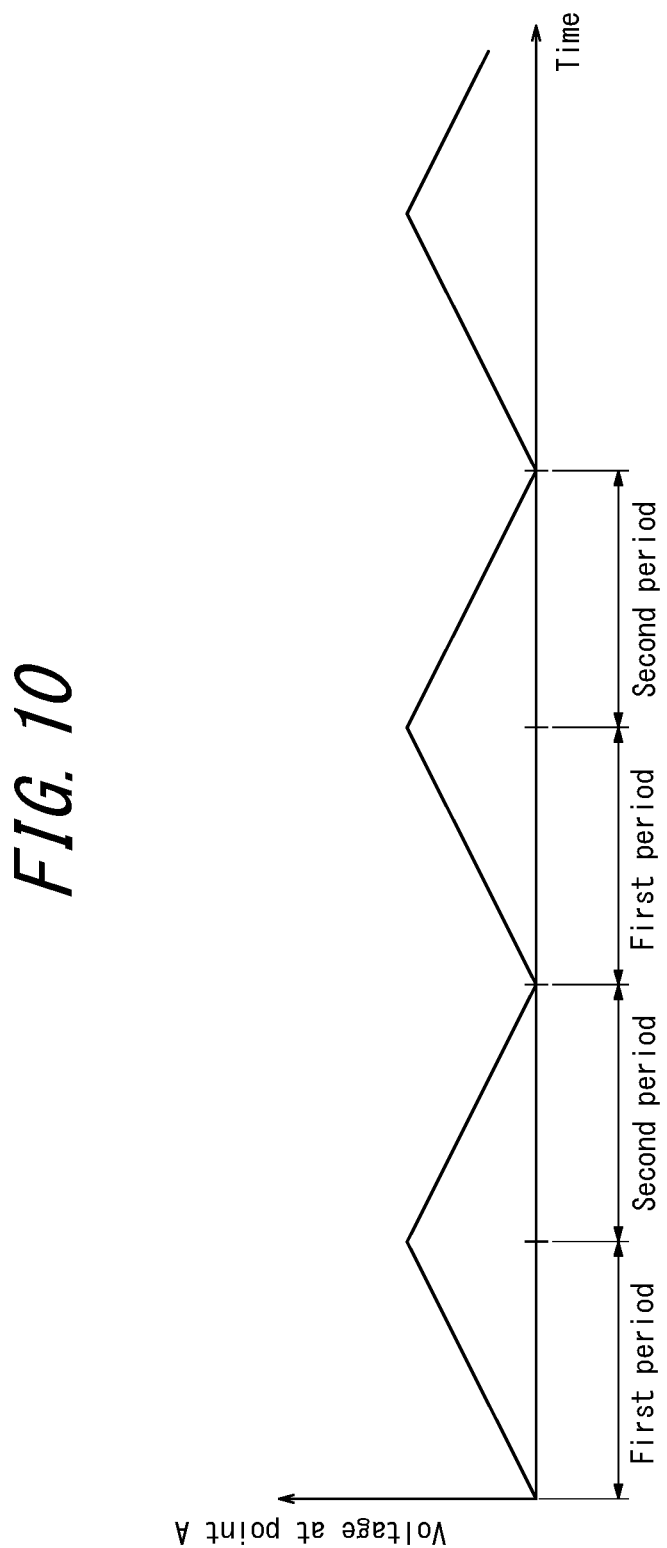
FIG. 10 is a diagram illustrating an example of a voltage at point A in FIG. 9.

FIG. 10 illustrates time-dependence of voltage at point A, which is an output of the wave shaping circuit 104. The timer 105 alternately generates the timing of the first period and the second period, and outputs it to the waveform shaping circuit 104. The first period and the second period may be the same time interval or different time intervals.

The waveform shaping circuit 104 increases the voltage at point A with time during the first period. That is, the waveform shaping circuit 104 increases the current supplied to the light-emitting element 107 with time during the first period.

The waveform shaping circuit 104 decreases the voltage at point A with time during the second period. That is, the waveform shaping circuit 104 decreases the current supplied to the light-emitting element 107 with time during the second period.

The light-emitting element 107 receives a current whose waveform has been shaped by the wave shaping circuit 104, intensifies the emission strength with time in the first period, and weakens the emission strength with time in the second period.

Thus, the load circuit element 16 illustrated in FIG. 9 can allow the light-emitting element to emit light similar to that of fireflies by changing the light intensity with time. When the cover 12 having a light diffusing function as described later is used, the user who sees the light emitted from the light-emitting element 107 by the load circuit element 16 illustrated in FIG. 9 can feel the sense of life by seeing the light on the entire cover 12 expanding or shrinking in association with changes in light intensity.

(First Modification)

Figure 11A:
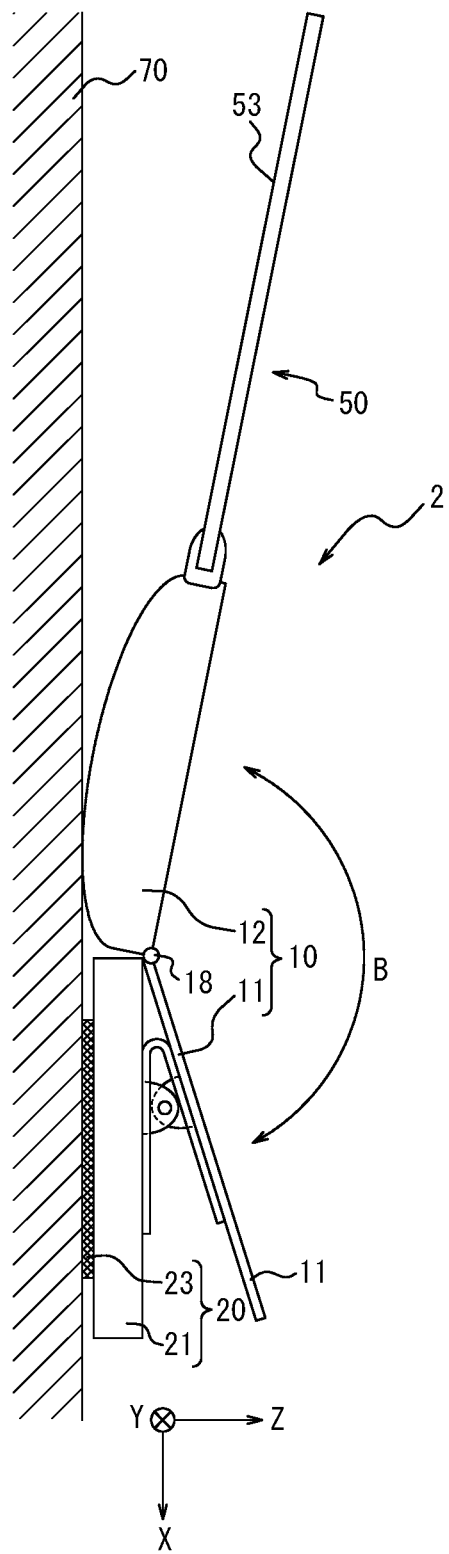
FIG. 11A is a side view illustrating a schematic configuration of an electronic device according to a first modification.
Figure 11B:
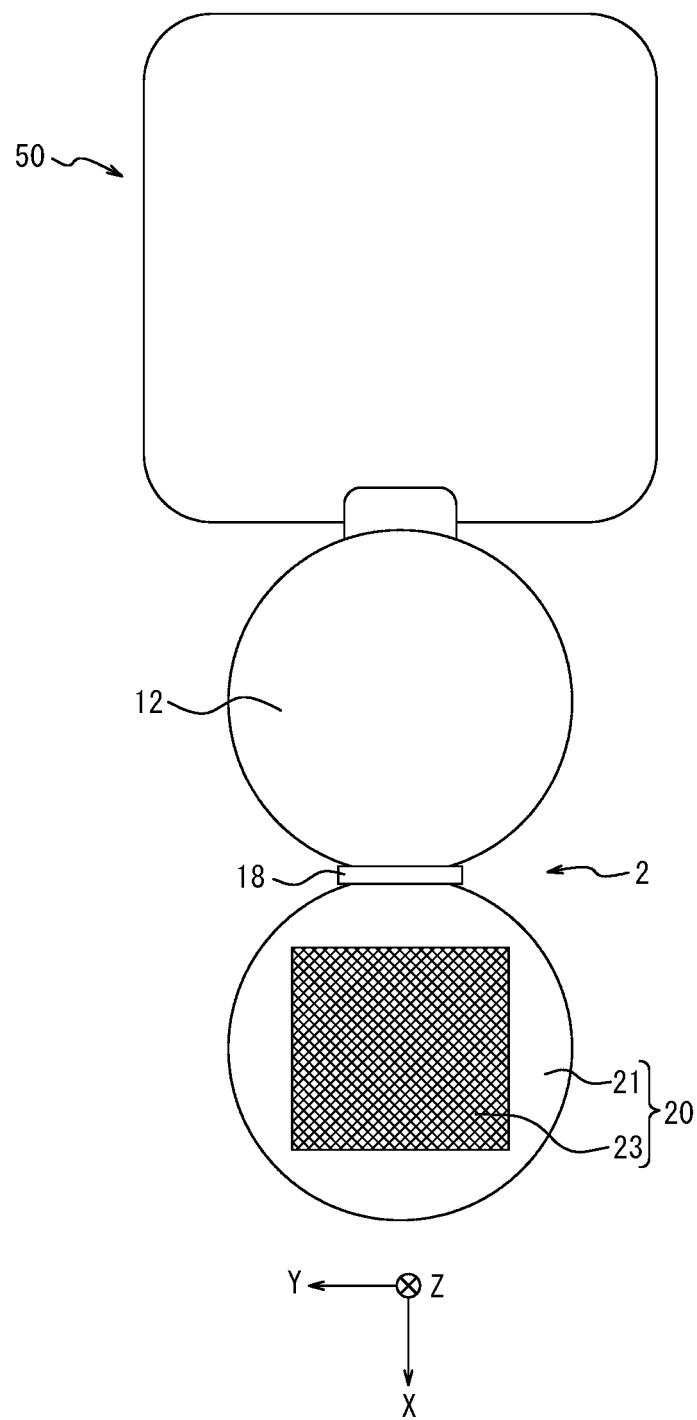
FIG. 11B is a diagram of a schematic configuration of the electronic device according to the first modification as viewed from the Z-axis negative direction side.

FIGS. 11A and 11B illustrate a schematic configuration of an electronic device 2 according to a first modification. The electronic device 2 according to the first modification will be mainly described in terms of features which are different from those of the electronic device 1 described with reference to FIGS. 1 to 8 and other drawings above.

FIG. 11A is a side view of the electronic device 2 to which the energy harvesting module 50 is mounted. In the electronic device 2 according to the first modification, the first housing 10 comprises, in addition to the first clip part 11 and the cover 12, a coupling part 18.

The coupling part 18 couples one end of the first clip part 11 and one end of the cover 12 such that the cover 12 is rotatable with respect to the first clip part 11. The coupling part 18 may be, for example, a hinge. By being coupled to the first clip part 11 by the coupling part 18, the cover 12 is rotatable along the direction B.

As illustrated in FIG. 11A, the second housing 20 may have an adhesive portion 23 that is adherable to an external support on the surface of the second clip part 21 that faces away from the first housing 10 (i.e., the surface on the Z-axis negative direction side). The term "adherable" as used herein includes the meaning of "stickable." FIG. 11A illustrates a state of the electronic device 2 attached via the adhesive portion 23 to a window 70 as the external support inside a room.

When the cover 12 is rotated away from the first clip part 11 with the electronic device 2 attached to the window 70 inside a room as illustrated in FIG. 11A, the light-receiving surface 53 of the energy harvesting module 50 can be directed to the window 70. Thus, the electronic device 2 can receive power from the energy harvesting module 50 by directing the light-receiving surface to the window 70 with the electronic device 2 being attached to the window 70 inside a room.

FIG. 11B is a diagram illustrating the electronic device 2 according to the first modification as viewed from the Z-axis negative direction side. In FIG. 11B, the window 70 is not illustrated.

(Second Modification)

Figure 12:
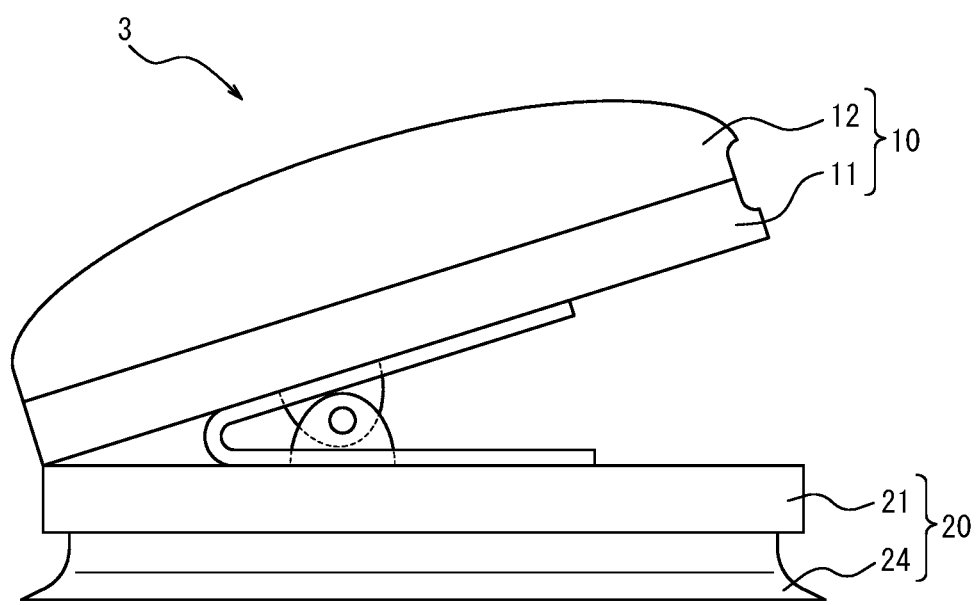
FIG. 12 is a diagram of a schematic configuration of an electronic device according to a second modification.
Figure 12:
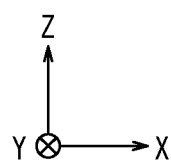

FIG. 12 illustrates a schematic configuration of an electronic device 3 according to a second modification. The electronic device 3 according to the second modification will be mainly described in terms of features which are different from those of the electronic device 1 described with reference to FIGS. 1 to 8 and other drawings above.

In the electronic device 3, the second housing 20 has a suction cup 24 on the surface of the second clip part 21 facing away from the first housing 10 (i.e., the surface on the Z-axis negative direction side).

By having the suction cup 24, the electronic device 3 can be attached to a wall, a window or other article for use. Thus, the electronic device 3 can be placed even at locations where its clipping function cannot be used, thereby increasing the freedom of placement.

(Third Modification)

Figure 13:
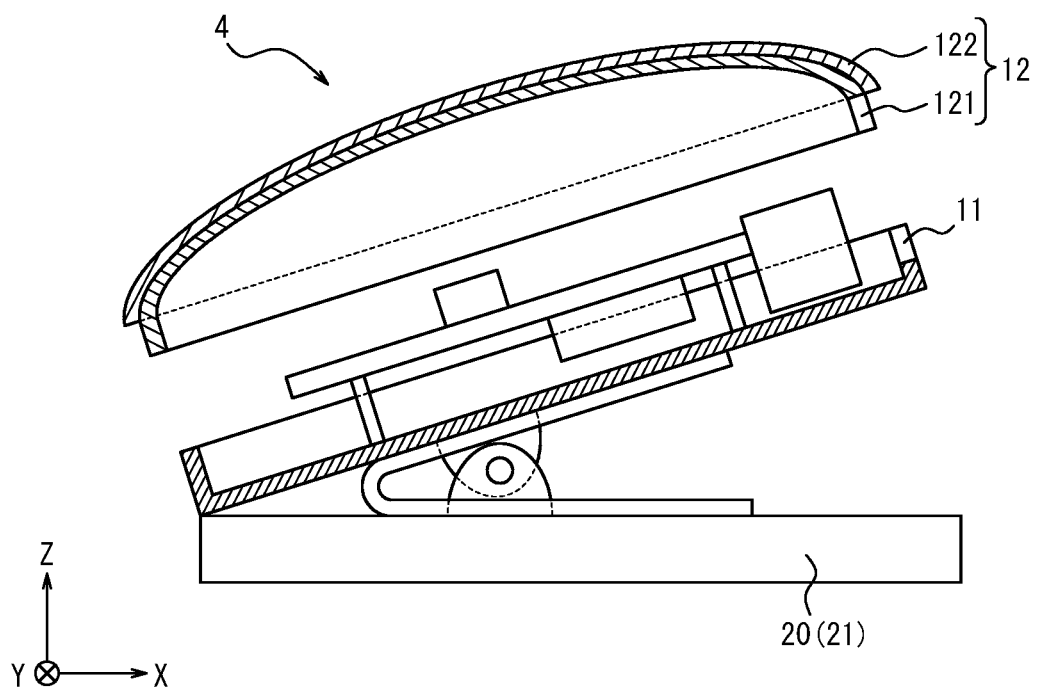
FIG. 13 is a diagram of a schematic configuration of an electronic device according to a third modification.

FIG. 13 illustrates a schematic configuration of an electronic device 4 according to a third modification. The electronic device 4 according to the third modification will be mainly described in terms of features which are different from those of the electronic device 1 described with reference to FIGS. 1 to 8 and other drawings above.

In the electronic device 4, the cover 12 comprises a plurality of cover units having light transparency: a first cover unit 121 and a second cover unit 122. In FIG. 13, in order to provide a better view of the configuration of the cover 12, the cover 12 is illustrated as being detached from the first clip part 11. As illustrated in FIG. 13, the second cover unit 122 is disposed outside the first cover unit 121.

The first cover unit 121 may have, for example, a light diffusing function. For example, with a light diffusing film provided on its surface, the first cover unit 121 can have a light diffusing function.

When the load circuit element 16 disposed within the first housing 10 is a light-emitting element, the first cover unit 121 with a light diffusing function can diffuse the light emitted by the light-emitting element.

The second cover unit 122 may have, for example, a half mirror function. The second cover unit 122 may be configured to have good design, for example.

With the cover 12 which comprises the first cover unit 121 having a light diffusing function, for example when the load circuit element 16 has a circuit configuration such as that illustrated in FIG. 9, light with varying intensity is diffused, so that it is possible to further enhance the effect of a feel of life.

(Fourth Modification)

Figure 14:
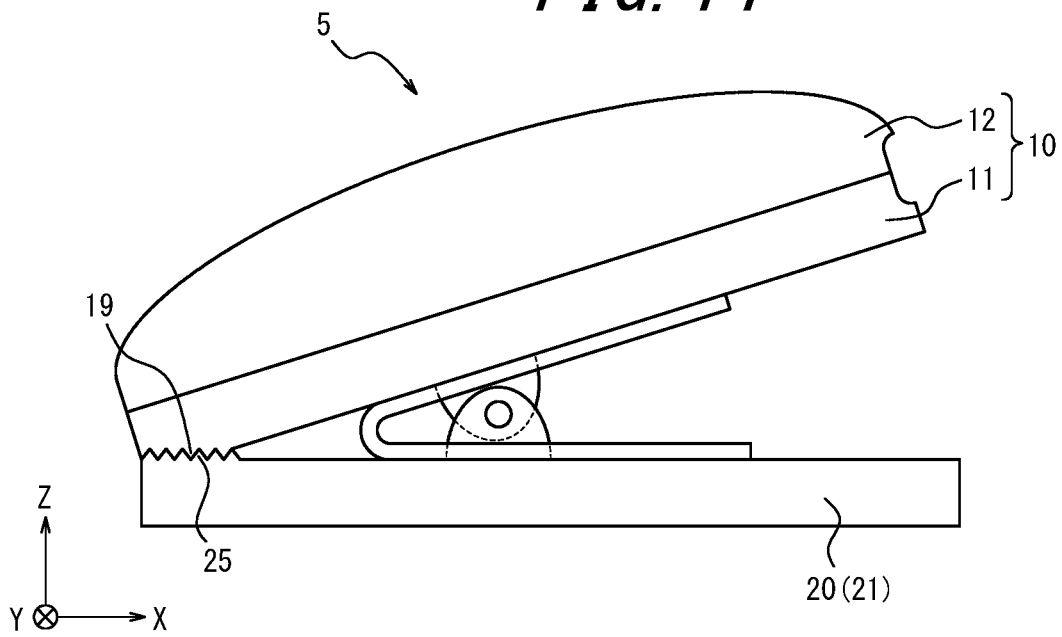
FIG. 14 is a diagram of a schematic configuration of an electronic device according to a fourth modification.

FIG. 14 illustrates a schematic configuration of an electronic device 5 according to a fourth modification. The electronic device 5 according to the fourth modification will be mainly described in terms of features which are different from those of the electronic device 1 described with reference to FIGS. 1 to 8 and other drawings above.

In the electronic device 5, the first clip part 11 has saw teeth 19 at one end. The second clip part 21 has saw teeth 25 at one end. The saw teeth 19 and the saw teeth 25 are configured to be meshed when the one end of the first clip part 11 abuts against the one end of the second clip part 21.

With the saw teeth 19 and the saw teeth 25 provided, the electronic device 5 can provide an antiskid effect when clamping an object.

The foregoing descriptions are merely directed to embodiments of the present disclosure and it goes without saying that various modifications and alterations can be made within the scope of the claims.

For example, although the wiring board 14 has been described above as being disposed within the first housing 10, the wiring board 14 may be disposed within the second housing 20.

Also for example, although the secondary battery 15 has been described above as being disposed within the first housing 10, the secondary battery 15 may be disposed within the second housing 20.

Also for example, although the load circuit element 16 has been described above as being disposed within the first housing 10, the load circuit element 16 may be disposed within the second housing 20.

Also for example, the wiring board 14 has been described above as being disposed within the first housing 10, the first clip part 11 constituting the first housing 10 may function as a wiring board. This makes it possible to further reduce the size of the first housing 10.

Also for example, when the cover 12 is attachable to and detachable from the first clip part 11, the connector 17 may be disposed within the cover 12. In this instance, the wiring board 14, the secondary battery 15 and the load circuit element 16 may also be disposed within the cover 12.

INDUSTRIAL APPLICABILITY

According to the present disclosure, it is possible to provide an electronic device which can be mounted to an object without applying direct stress to an energy harvesting module and which can receive power from the energy harvesting module.

REFERENCE SIGNS LIST 1, 2, 3, 4, 5 Electronic device
10 First housing
11 First clip part
12 Cover
13 Opening
14 Wiring board
15 Secondary battery
16 Load circuit element
17 Connector
18 Coupling part
19 Saw teeth
20 Second housing
21 Second clip part
22 Leg
23 Adhesive portion
24 Suction cup
25 Saw teeth
30 Support
31 First support
32 Second support
33 Support shaft
35 Spring
50 Energy harvesting module
51 Energy harvesting element
52 Connector
53 Light-receiving surface
60 String
70 Window
101 Charge current control circuit
102 Charge status detection circuit
103 Switch
104 Wave shaping circuit
105 Timer
106 Resistor
107 Light-emitting element
121 First cover unit
122 Second cover unit

The invention claimed is:

1. An electronic device comprising:
a first housing;
a second housing;
a support configured to couple the first housing and the second housing such that the first housing is rotatable with respect to the second housing;
a spring configured to apply an elastic force to the first housing and the second housing such that one end of the first housing abuts against one end of the second housing; and
a connector disposed within the first housing,
wherein the first housing, the second housing, the support and the spring function as a clip capable of clamping an object between the one end of the first housing and the one end of the second housing, and
wherein the connector is mechanically and electrically attachable to or detachable from a connector of an external energy harvesting module through an opening provided in a side surface of the first housing, and
the electronic device comprising further comprising:
a rechargeable battery configured to store therein power that is supplied from the energy harvesting module via the connector;
a load circuit element capable of consuming power supplied from the energy harvesting module or power supplied from the rechargeable battery; and
a wiring board,
wherein the rechargeable battery and the wiring board are disposed within the first housing,
wherein the load circuit element is disposed on the wiring board, and
wherein the rechargeable battery is disposed between a surface of the first housing on the second housing side and the wiring board.

2. The electronic device of claim 1, wherein the load circuit element is a light-emitting device.

3. The electronic device of claim 1, wherein the load circuit element comprises:
a light-emitting element,
a timer configured to alternately generate a first period and a second period; and
a waveform shaping circuit configured to control a current supplied to the light-emitting element,
wherein the wave shaping circuit increases a current supplied to the light-emitting element with time during the first period, and decreases a current supplied to the light-emitting element with time during the second period.

4. The electronic device of claim 1, wherein the second housing has a flat bottom surface or a leg.

5. The electronic device of claim 1, wherein the first housing comprises a first clip part coupled to the support and the spring, and a cover which is attachable to and detachable from the first clip part.

6. The electronic device of claim 1, wherein the first housing comprises:
a first clip part coupled to the support and the spring;
a cover; and
a coupling part configured to couple one end of the first clip part and one end of the cover, wherein
the cover is rotatable about the coupling part as a support with respect to the first clip part.

7. The electronic device of claim 5, wherein the cover comprises a plurality of cover units having light transparency.

8. The electronic device of claim 1, wherein the second housing has an adhesive portion which is adherable to an external support.

* * * * *